United States Patent
Lee et al.

(10) Patent No.: US 10,585,499 B2
(45) Date of Patent: Mar. 10, 2020

(54) DEVICE AND METHOD OF DETECTING POINTER

(71) Applicant: Samsung Electronics Co., Ltd., Suwon-si, Gyeonggi-do (KR)

(72) Inventors: Kyung-hoon Lee, Seoul (KR); Sang-pil Nam, Pohang-si (KR); Michael Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 146 days.

(21) Appl. No.: 15/814,137

(22) Filed: Nov. 15, 2017

(65) Prior Publication Data
US 2018/0260045 A1 Sep. 13, 2018

(30) Foreign Application Priority Data
Mar. 7, 2017 (KR) .................. 10-2017-0029059

(51) Int. Cl.
*G06F 3/0354* (2013.01)
*G06F 3/041* (2006.01)
*G06F 3/044* (2006.01)

(52) U.S. Cl.
CPC ...... *G06F 3/03545* (2013.01); *G06F 3/03547* (2013.01); *G06F 3/044* (2013.01); *G06F 3/0418* (2013.01); *G06F 2203/04104* (2013.01); *G06F 2203/04108* (2013.01)

(58) Field of Classification Search
CPC combination set(s) only.
See application file for complete search history.

(56) References Cited

U.S. PATENT DOCUMENTS

| | | | |
|---|---|---|---|
| 5,571,997 A | 11/1996 | Gray et al. | |
| 8,433,013 B2 | 4/2013 | Nakano et al. | |
| 2006/0232269 A1* | 10/2006 | Sills | G06F 3/03547 324/207.17 |
| 2013/0033442 A1 | 2/2013 | Chu et al. | |
| 2013/0176269 A1* | 7/2013 | Sobel | G06F 3/044 345/174 |
| 2013/0234977 A1* | 9/2013 | Lin | G06F 3/044 345/174 |
| 2014/0078101 A1 | 3/2014 | Katsurahira | |
| 2016/0124544 A1 | 5/2016 | Kang et al. | |
| 2018/0032176 A1* | 2/2018 | Krah | G02F 1/13338 |

FOREIGN PATENT DOCUMENTS

| | | |
|---|---|---|
| JP | 9-81298 A | 3/1997 |
| JP | 2000-295041 A | 10/2000 |
| JP | 2002-207563 A | 7/2002 |

* cited by examiner

*Primary Examiner* — Deeprose Subedi
(74) *Attorney, Agent, or Firm* — Myers Bigel, P.A.

(57) ABSTRACT

A pointer detection device for processing an input signal varying according to a touch of a pointer includes: a mixer configured to generate a first output signal by heterodyning the input signal according to a frequency of a local oscillator; and a filter configured to output a second output signal by filtering the first output signal, wherein the mixer is configured to shift a frequency band corresponding to the pointer to a pass band of the filter.

15 Claims, 23 Drawing Sheets

DEVICE AND METHOD OF DETECTING POINTER

REFERENCE TO PRIORITY APPLICATION

This application claims the benefit of Korean Patent Application No. 10-2017-0029059, filed on Mar. 7, 2017, in the Korean Intellectual Property Office, the disclosure of which is incorporated herein in its entirety by reference.

BACKGROUND

The inventive concept relates to pointer detection, and more particularly, to a device and a method of detecting a pointer.

Various electronic devices are equipped with a touch panel. The touch panel may include a plurality of electrodes for detecting a pointer and provide an area that a pointer outside an electronic device may touch. Coordinates of the location on the touch panel touched by the pointer may be recognized by processing signals provided from at least one of the plurality of electrodes included in the touch panel. In addition, when the pointer touches the touch panel, the electronic device may additionally provide various functions by recognizing not only the coordinates of the location touched by the pointer but also pressure applied to the touch panel by the pointer. However, the signals provided from the touch panel may include not only noise generated inside the electronic device but also noise generated outside the electronic device, and thus canceling such noise may be important for accurate pointer detection.

SUMMARY

The inventive concept provides a device and a method for accurately detecting a pointer by canceling noise from signals received from a touch panel.

According to an aspect of the inventive concept, there is provided a pointer detection device for processing an input signal varying according to a touch of a pointer. The detection device includes a mixer, which is configured to generate a first output signal by heterodyning the input signal according to a frequency of a local oscillator, and a filter configured to output a second output signal by filtering the first output signal. The mixer is further configured to shift a frequency band corresponding to the pointer to a pass band of the filter.

According to another aspect of the inventive concept, there is provided a method of detecting a pointer by processing an input signal varying according to a touch of a pointer. This method includes receiving the input signal from a touch panel, shifting a frequency band corresponding to the pointer by a shift frequency in the input signal, and filtering a signal including the shifted frequency band by passing the shifted frequency band. The shift frequency may be determined based on a cutoff frequency during the filtering.

According to another aspect of the inventive concept, there is provided a pointer detection device for processing an input signal varying according to a touch of a pointer. The pointer detection device includes a noise cancellation circuit, which is configured to shift a frequency band corresponding to the pointer in the input signal and filter a signal including the shifted frequency band by passing the shifted frequency band, and a controller configured to detect a touch and pressure applied by the pointer based on the filtered signal output from the noise cancellation circuit.

According to further aspects of the inventive concepts, there is provided a pointer detection device, which includes a mixer and a filter. The mixer is configured to generate a first output signal by heterodyning a local oscillator signal having a first frequency with an input signal having at least one signal characteristic (e.g., frequency, voltage, phase, etc.) that varies in response to a touch of a pointer. The filter is configured to generate a second output signal in response to filtering the first output signal, which may have a frequency within a passband frequency range of the filter. A controller is also provided, which is configured to generate a touch detection signal in response to the second output signal. This touch detection signal can have a characteristic that is a function of a degree of pressure applied by the pointer to a touch panel device, which is configured to generate the input signal. In some further aspects of the inventive concept, the controller may generate a feedback control signal, which sets a frequency of a local oscillator within the pointer detection device. For example, the controller may be configured to set the frequency of the local oscillator to a second frequency by adjusting a frequency of the second output signal by a frequency offset, which is associated with a cutoff frequency of the filter.

In still further aspects of the inventive concept, a variable gain amplifier is provided, which is configured to generate a third output signal in response to the second output signal. According to these aspects, the controller may be configured to generate the touch detection signal in response to the third output signal. This controller may include an analog-to-digital converter (ADC), which is responsive to the third output signal, and a digital signal processor (DSP), which is responsive to a digital signal generated at an output of the ADC. This DSP may generate the feedback control signal.

BRIEF DESCRIPTION OF THE DRAWINGS

Example embodiments of the inventive concept will be more clearly understood from the following detailed description taken in conjunction with the accompanying drawings in which.

DETAILED DESCRIPTION OF THE EMBODIMENTS

Figure 1:
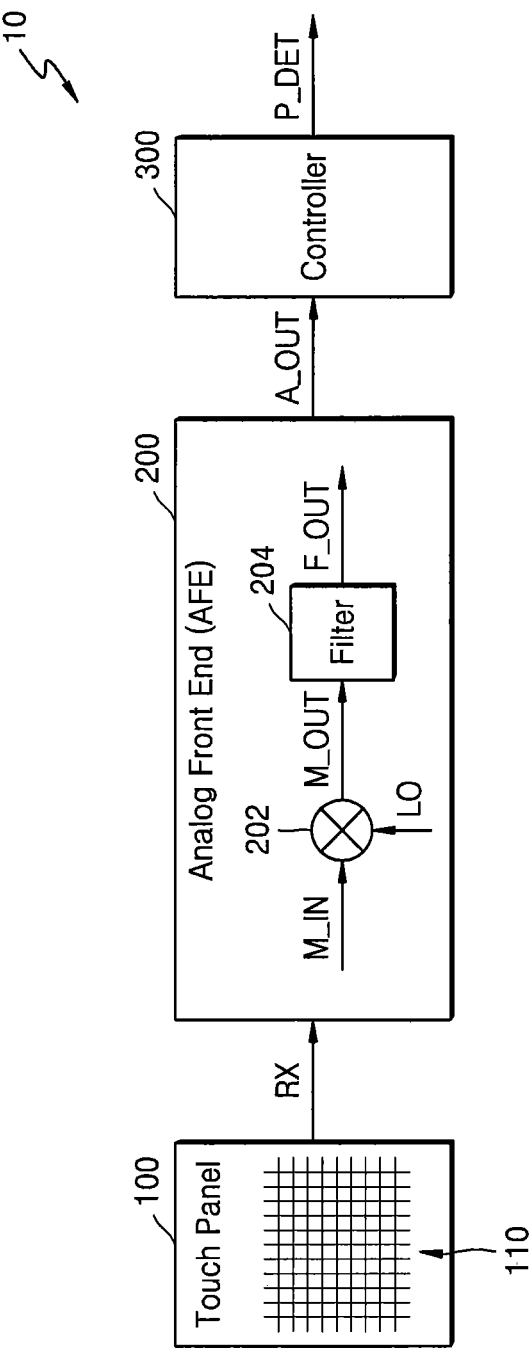
FIG. 1 is a block diagram of a pointer detection device according to an example embodiment of the inventive concept.

FIG. 1 is a block diagram of a pointer detection device 10 according to an example embodiment of the inventive concept. As illustrated in FIG. 1, the pointer detection device 10 may include a touch panel 100, an analog front end (AFE) 200, and a controller 300. FIG. 1 shows that the pointer detection device 10 includes the touch panel 100. However, the AFE 200, which is for processing a received signal RX provided by the touch panel 100, and the controller 300, may collectively be referred to as a pointer detection device while excluding the touch panel 100.

The pointer detection device 10 may be included in various electronic devices as a means for receiving an input from the outside. For example, an electronic device including the pointer detection device 10 may be an independent device such as a personal computer (PC), a network server, a tablet PC, an e-reader, a personal digital assistant (PDA), a portable multimedia player (PMP), a mobile phone, etc., or a control system for receiving an external input as a part included in an automobile, a mechanical device, a manufacturing facility, a door, etc.

The touch panel 100 may include a plurality of electrodes 110. For example, the plurality of electrodes 110 may include first electrodes extending in a first direction and receiving signals (e.g., TX in FIG. 3) from the outside of the touch panel 100, and second electrodes outputting a signal (e.g., RX) from the panel 100. A second electrode disposed at a point touched by the pointer from among the second electrodes may provide a signal different from those of the other second electrodes due to capacitance changed by the pointer. The touch of the pointer on the touch panel 100 may indicate that the pointer is touching or approaching the touch panel 100.

The pointer may refer to an arbitrary object that may cause a change in a signal (e.g., RX) output by the touch panel 100 by being touched by the touch panel 100. For example, the pointer may be a part of a user's body (e.g., a finger) that touches an electronic device including the pointer detection device 10, may be an article a user wears or uses (e.g., gloves or a pen), or may be a part of another system which may have a variety of locations depending on operations. As will be described below, pressure applied to the touch panel 100 by the pointer as well as coordinates of the location on the touch panel 100 touched by the pointer may be recognized by processing a signal (e.g., RX) output from the touch panel 100, so that the electronic device may provide additional functions depending on the pressure applied by the pointer.

The AFE 200 may receive the received signal RX (or the input signal) from the touch panel 100 and provide an AFE output signal A_OUT to the controller 300. As described above, the received signal RX received from the touch panel 100 may be an analog signal that varies according to the touch of a pointer, and the AFE 200 may provide the AFE output signal A_OUT by processing the received signal RX so that the controller 300 may easily detect the pointer. For example, the AFE 200 may convert or amplify the received signal RX and may cancel noise included in the received signal RX.

The received signal RX provided from the touch panel 100 may include a variety of noise. That is, as described later below with reference to FIGS. 2A to 2C, the received signal RX may vary not only according to a pointer but also according to a variety of noise. For example, the received signal RX may include noise generated from other components included in an electronic device, lights outside the touch panel 100, a charger connected to the electronic device, and the like, and thus canceling such noise may interfere with accurate detection of a pointer. As will be described below, according to an example embodiment of the inventive concept, noise in the received signal RX may be effectively canceled through frequency shifting and filtering and may be canceled at a low cost due to the simple structure of the AFE 200.

As illustrated in FIG. 1, the AFE 200 may include a mixer 202 and a filter 204. The mixer 202 may provide a mixer output signal M_OUT by heterodyning a mixer input signal M_IN and a local oscillator signal LO. That is, the mixer 202 may shift a frequency of the mixer input signal M_IN according to a frequency of the local oscillator signal LO (a frequency of a local oscillator or a shift frequency). As will be described below with reference to FIG. 3, the received signal RX provided by the touch panel 100 may be modified by a pointer from a signal (e.g., TX in FIG. 3) which is provided to the touch panel 100 and has a constant frequency, and thus may include a frequency band corresponding to the pointer. The frequency band corresponding to the pointer in the received signal RX may include a frequency of a signal provided to the touch panel 100 or a frequency adjacent thereto. The mixer input signal M_IN may be a signal that is the same as the received signal RX or a signal generated by buffering, amplifying or converting the received signal RX, and may have a frequency spectrum substantially equal to that of the received signal RX. The mixer 202 may generate the mixer output signal M_OUT by shifting a frequency band corresponding to a pointer included in the mixer input signal M_IN to a pass band of the filter 204 according to the frequency of the local oscillator signal LO. An operation of the mixer 202 will be described later below in detail with reference to FIGS. 2A to 2C.

The filter 204 may generate a filter output signal F_OUT from the mixer output signal M_OUT. The filter 204 may have a pass band and a stop band at a boundary of at least one cutoff frequency. The filter 204 may be designed to have a cutoff frequency that provides good filtering performance, and magnitude by which a frequency band corresponding to a pointer is shifted by the mixer 202 may be determined by the frequency corresponding to the pointer and the frequency of the local oscillator signal LO, wherein the frequency of the local oscillator signal LO may be determined based on the cutoff frequency of the filter 204. Also, as described later below with reference to FIG. 5 and the like, in an example embodiment, the frequency of the local oscillator signal LO may be adjusted by the controller 300 and thus noise may be effectively canceled. The AFE output signal A_OUT may be a signal that is the same as the filter output signal F_OUT or a signal obtained by amplifying the filter output signal F_OUT, and may be a signal from which noise has been canceled by the mixer 202 and the filter 204. The mixer 202 and the filter 204 included in the AFE 200 may be referred to as a noise cancellation circuit. In an example embodiment, the filter 204 may be a switched capacitor filter (or a discrete-time filter) including a plurality of unit capacitors and may be a continuous-time filter including at least one active or passive device.

The controller 300 may generate a pointer detection signal P_DET by detecting a pointer based on the AFE output signal A_OUT provided by the AFE 200. For example, the controller 300 may detect a touch and pressure of a pointer based on magnitude and a frequency of the AFE output signal A_OUT, and generate the pointer detection signal P_DET including information on coordinates and the pressure applied by the pointer.

Figure 2A:
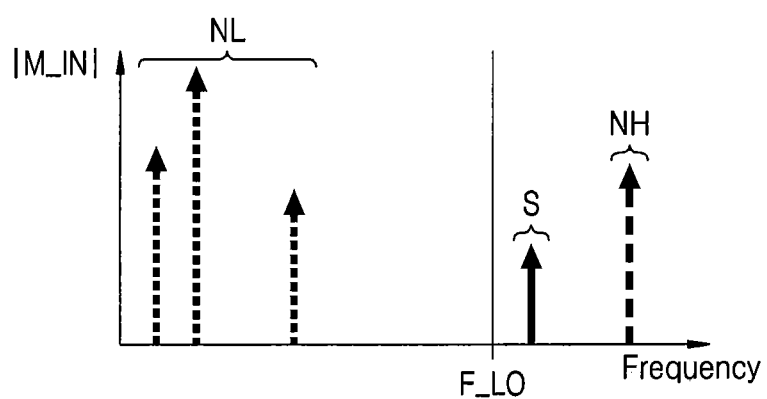
FIGS. 2A to 2C are graphs illustrating internal signals of an analog front end (AFE) of FIG. 1 in a frequency domain, according to an example embodiment of the inventive concept.
Figure 2B:
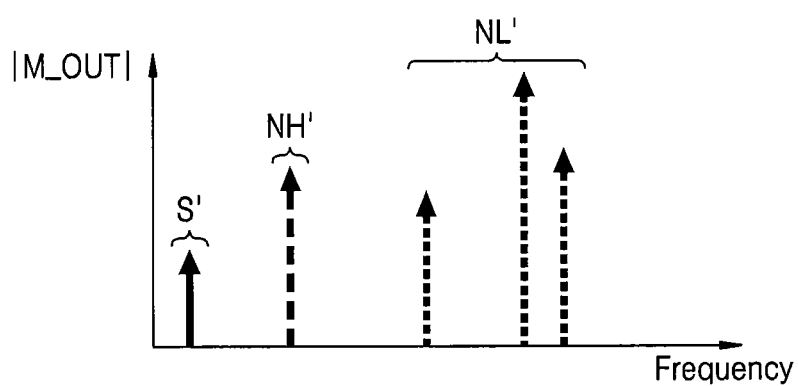
Figure 2C:
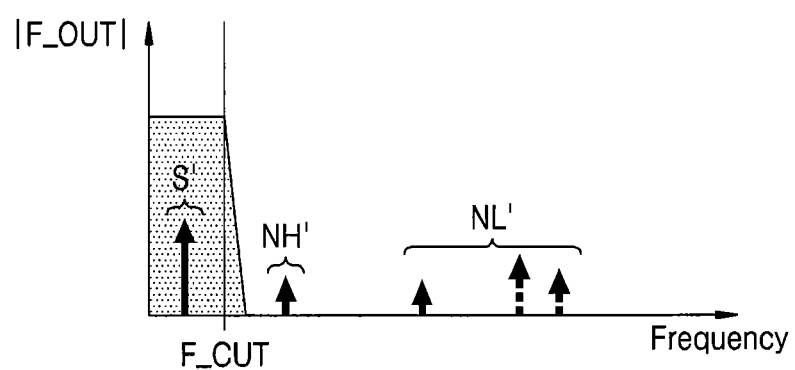

FIGS. 2A to 2C are graphs illustrating internal signals of the AFE 200 of FIG. 1 in a frequency domain, according to an example embodiment of the inventive concept. In more detail, FIG. 2A shows the mixer input signal M_IN, FIG. 2B shows the mixer output signal M_OUT, and FIG. 2C shows the filter output signal F_OUT. As described above with reference to FIG. 1, the mixer 202 may provide the mixer output signal M_OUT by heterodyning the mixer input signal M_IN according to the frequency of the local oscillator signal LO, and the filter 204 may provide the filter output signal F_OUT by filtering the mixer output signal M_OUT. Hereinafter, FIGS. 2A to 2C will be described with reference to FIG. 1, and for convenience of illustration, frequency components of the signals are shown as arrows in FIGS. 2A to 2C.

Referring to FIG. 2A, the mixer input signal M_IN generated from the received signal RX received by the AFE 200 may include frequency bands NL and NH due to noise in addition to a frequency band S corresponding to a pointer. That is, as illustrated in FIG. 2A, the mixer input signal M_IN may include a high-frequency band NH due to noise at a frequency higher than that of the frequency band S corresponding to a pointer, as well as a low-frequency band NL due to noise at a frequency lower than that of the frequency band S corresponding to a pointer.

In order to remove the low-frequency band NL and the high-frequency band NH and to extract the frequency band S corresponding to a pointer, a band-pass filter having a pass band including the frequency band S corresponding to a pointer may be considered. However, the band-pass filter having high filtering performance for removing both the low-frequency band NL and the high-frequency band NH may have high power consumption and a large area in addition to a complicated structure. As will be described below, according to an example embodiment of the inventive concept, the frequency band S corresponding to a pointer may be shifted away from the frequency bands NL and NH due to noise, and thus may be extracted by the filter 204 which is efficient in terms of performance and cost. In an example embodiment, as illustrated in FIG. 2A, the local oscillator signal LO may have a frequency F_LO close to the frequency band S corresponding to a pointer to shift the frequency band S corresponding to a pointer.

Referring to FIG. 2B, the mixer output signal M_OUT may include frequency components respectively corresponding to differences and sums of frequency components of the mixer input signal M_IN and the frequency F_LO of the local oscillator signal LO due to heterodyning. For example, the local oscillator signal LO may have the frequency F_LO close to the frequency band S corresponding to a pointer, and thus a frequency component, which corresponds to a difference between the frequency band S corresponding to a pointer in the mixer output signal M_OUT and the frequency F_LO of the local oscillator signal LO, may be spaced apart from other frequency components. As illustrated in FIG. 2B, the low-frequency band NL, the frequency band S, and the high-frequency band NH of FIG. 2A may be respectively shifted to frequency bands NL', S', and NH' according to differences between the frequency F_LO of the local oscillator signal LO and each of the low-frequency band NL, the frequency band S, and the high-frequency band NH. Accordingly, the frequency bands NL' and NH' due to noise may be located on one side of the frequency band S'.

Referring to FIG. 2C, the frequency band S' of FIG. 2B may be extracted by the filter 204 having a cutoff frequency F_CUT. That is, as the mixer output signal M_OUT of FIG. 2B passes through the filter 204 having the cutoff frequency F_CUT, the frequency band S' of FIG. 2B passes through the pass band of the filter 204 while the frequency bands NL' and NH' due to noise pass through the stop band of the filter 204. Thus, as illustrated in FIG. 2C, the frequency bands NL' and NH' due to noise in the filter output signal F_OUT may be attenuated.

Figure 3:
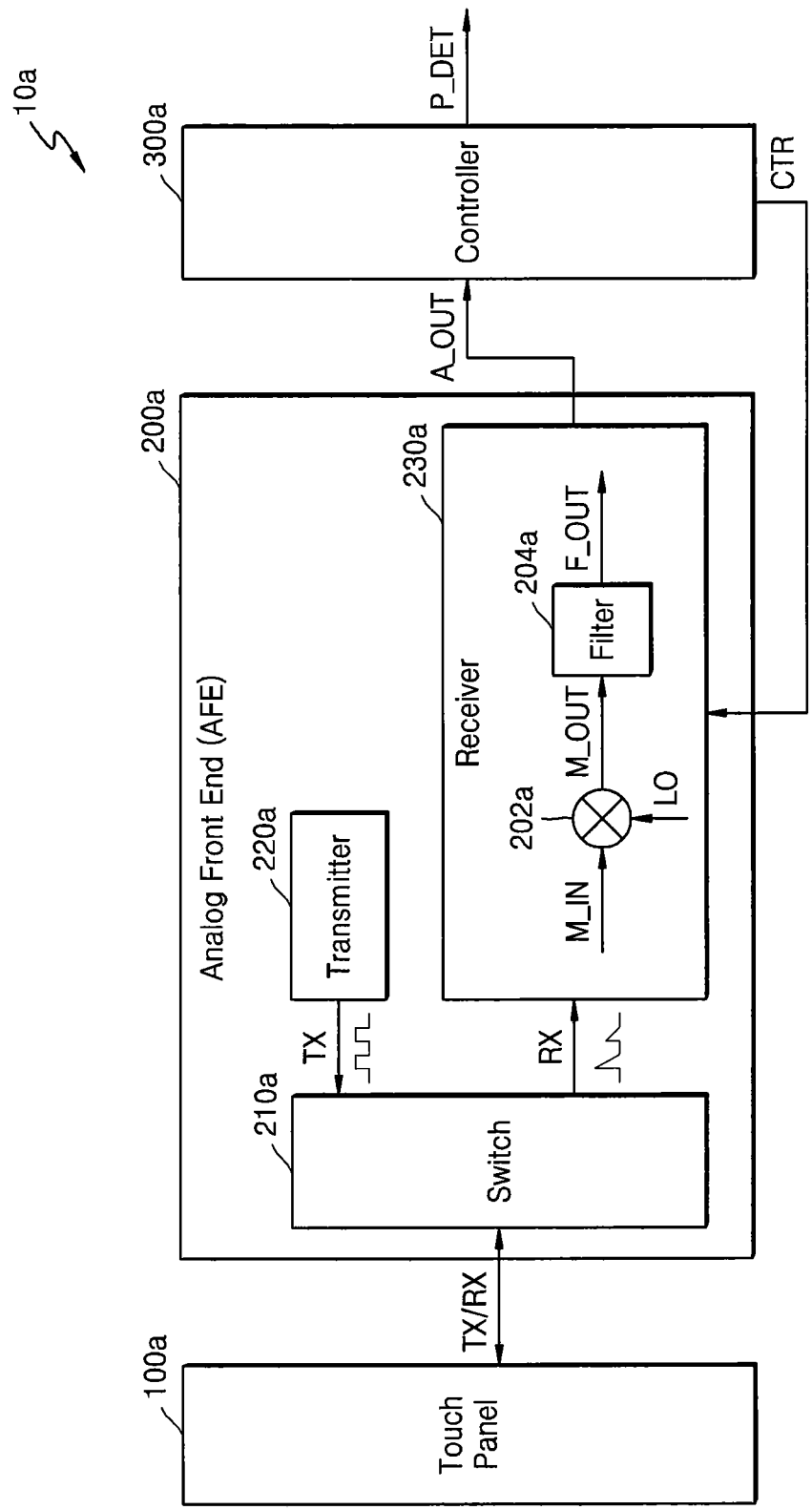
FIG. 3 is a block diagram of a pointer detection device according to an example embodiment of the inventive concept.

FIG. 3 is a block diagram of a pointer detection device 10a according to an example embodiment of the inventive concept. As illustrated in FIG. 3, the pointer detection device 10a may include a touch panel 100a, an AFE 200a, and a controller 300a.

Referring to FIG. 3, the AFE 200a may include a switch 210a, a transmitter 220a, and a receiver 230a. The switch 210a may connect the touch panel 100a to the transmitter 220a or the receiver 230a. That is, the switch 210a may provide a transmission signal TX provided from the transmitter 220a to the touch panel 100a or may provide the received signal RX provided by the touch panel 100a to the receiver 230a. In an example embodiment, the switch 210a may alternately connect the transmitter 220a and the receiver 230a to the touch panel 100a. For example, the switch 210a may be operated so that the transmission signal TX generated by the transmitter 220a is provided to the touch panel 100a, and the received signal RX provided by the touch panel 100a in response to the transmission signal TX is supplied to the receiver 230a.

The transmitter 220a may generate the transmission signal TX having a constant frequency. For example, the transmitter 220a may include an oscillator for generating a vibration signal having a constant frequency and an amplifier for generating the transmission signal TX by amplifying the generated vibration signal, wherein the amplifier is a current driver and may generate the transmission signal TX of which current oscillates.

The receiver 230a may receive the received signal RX provided by the touch panel 100a through the switch 210a and may generate the AFE output signal A_OUT by processing the received signal RX. The receiver 230a may include a mixer 202a and a filter 204a, and similar to the mixer 202 and the filter 204 of FIG. 1, the mixer 202a and the filter 204a may effectively cancel noise in the received signal RX by shifting and filtering a frequency band of the received signal RX.

The controller 300a, similar to the controller 300 of FIG. 1, may generate the pointer detection signal P_DET by detecting a pointer based on the AFE output signal A_OUT. For example, the controller 300a may detect magnitude and frequency components of the AFE output signal A_OUT, and may output the pointer detection signal P_DET including information on coordinates and pressure of a pointer based on the detected magnitude and frequency components of the AFE output signal A_OUT.

The controller 300a may generate a control signal CTR for controlling the AFE 200a. For example, the controller 300a may adjust, through the control signal CTR, magnitude of shifting a frequency of the received signal RX. That is, the frequency of the local oscillator signal LO input to the mixer 202a of the receiver 230a may be set according to the control signal CTR. Accordingly, the controller 300a may adaptively shift a frequency of the mixer input signal M_IN so that a frequency band corresponding to a pointer is included in a pass band of the filter 204a and a frequency band due to noise is included in the stop band of the filter 204. Details regarding how the controller 300a adaptively controls the frequency of the local oscillator signal LO through the control signal CTR will be described with reference to FIGS. 4A and 4B.

Figure 4A:
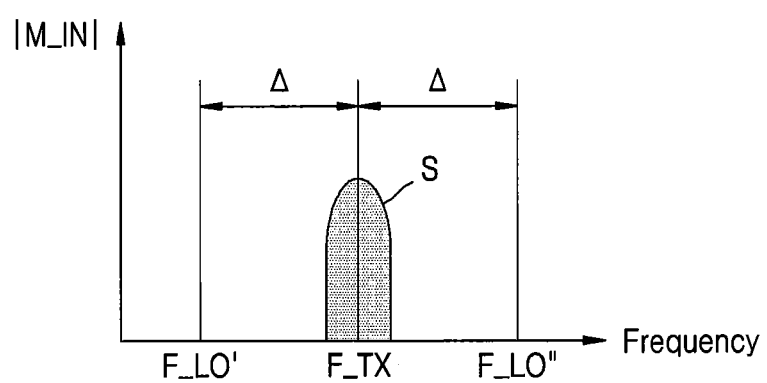
FIGS. 4A and 4B are graphs illustrating internal signals of an AFE of FIG. 3 in a frequency domain, according to an example embodiment of the inventive concept.
Figure 4B:
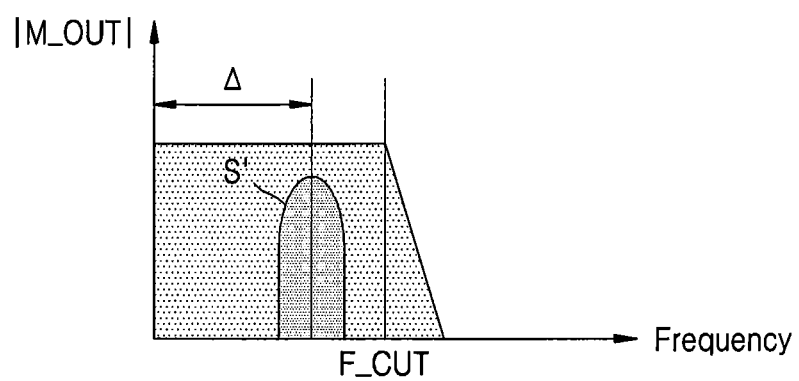

FIGS. 4A and 4B are graphs illustrating internal signals of the AFE 200a of FIG. 3 in a frequency domain, according to an example embodiment of the inventive concept. As described above with reference to FIG. 3, the frequency of the local oscillator signal LO used to shift the frequency of the received signal RX may be set by the control signal CTR. In more detail, FIGS. 4A and 4B respectively show the mixer input signal M_IN and the mixer output signal M_OUT, and will be described below with reference to FIGS. 1 and 3.

Referring to FIG. 4A, the frequency of the local oscillator signal LO may be determined based on a frequency F_TX of the transmission signal TX of FIG. 3. The received signal RX is generated from the transmission signal TX so that the frequency band S corresponding to a pointer may be adjacent to the frequency F_TX of the transmission signal TX as shown in FIG. 4A. In an example embodiment, the frequency of the local oscillator signal LO may be determined by adding or subtracting a constant frequency offset Δ to or from the frequency F_TX of the transmission signal TX. For example, as illustrated in FIG. 4A, the frequency of the local oscillator signal LO may be a frequency F_LO' obtained by subtracting the frequency offset Δ from the frequency F_TX of the transmission signal TX, or may be a frequency F_LO" obtained by adding the frequency offset Δ to the frequency F_TX of the transmission signal TX. In an example embodiment, a frequency spaced further away from a frequency component of noise in the frequencies F_LO' and F_LO" may be determined as the frequency F_LO of the local oscillator signal LO.

Referring to FIO. 4B, the frequency offset Δ used to determine the frequency F_LO of the local oscillator signal LO may be determined based on the cutoff frequency F_CUT of the filter 204. A difference between the frequency of the local oscillator signal LO and the frequency band S (or a center frequency of the frequency band S) corresponding to a pointer may be approximately the frequency offset Δ, and a location of the frequency band S' shifted from the frequency band S corresponding to a pointer may be determined by the frequency offset Δ. For example, when the filter 204 is a low-pass filter having the cutoff frequency F_CUT as illustrated in FIG. 4B, the frequency offset Δ may be less than the cutoff frequency F_CUT so that the shifted frequency band S' is included in a pass band of the low-pass filter. As a result, the frequency of the local oscillator signal LO (the frequency of the local oscillator or the shift frequency) may be determined based on the frequency F_TX of the transmission signal TX and the cutoff frequency F_CUT of the filter 204.

Figure 5:
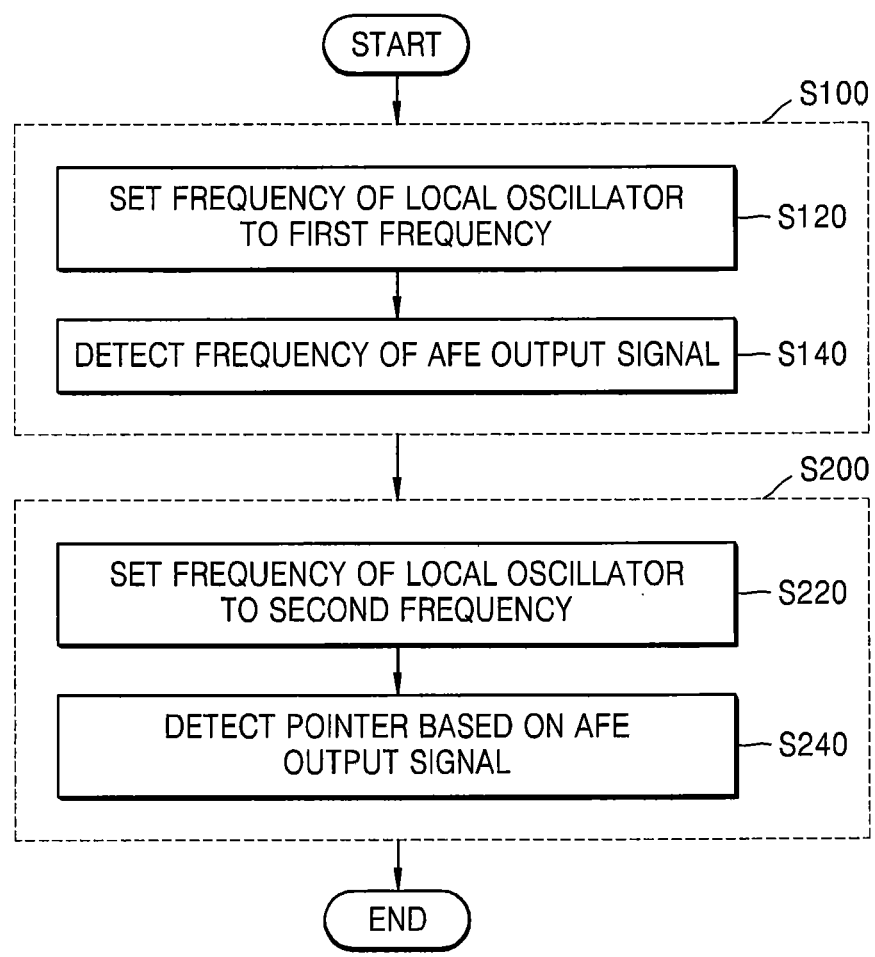
FIG. 5 is a flowchart of operations of a controller of FIG. 3, according to an example embodiment of the inventive concept.

FIG. 5 is a flowchart of an operation of the controller 300a of FIG. 3, according to an example embodiment of the inventive concept. As described above with reference to FIG. 3, the controller 300a may detect a pointer based on the AFE output signal A_OUT and may generate the control signal CTR that controls the AFE 200a. Hereinafter, FIG. 5 will be described with reference to FIG. 3.

Referring to FIG. 5, the controller 300a may sequentially operate in a first mode S100 and a second mode S200. The controller 300a may coarsely detect a pointer in the first mode S100 and the controller 300a may finely detect a pointer in the second mode S200 based on the coarse detection of the first mode S100. The first mode S100 and the second mode S200 may be referred to as a coarse mode and a fine mode, respectively. As illustrated in FIG. 5, the first mode S100 may include operations S120 and S140, and the second mode S200 may include operations S220 and S240.

In operation S120, a frequency of a local oscillator may be set to a first frequency. For example, the controller 300a may set the frequency of the local oscillator to the first frequency to coarsely detect a pointer. Capacitance that is changed by a pointer that touches the touch panel 100a or capacitance that can be processed by a pointer detection device may be within a limited range.

In operation S140, a frequency of the AFE output signal A_OUT may be detected. For example, the controller 300a may convert the AFE output signal A_OUT into a digital signal and may further convert the converted digital signal into a frequency domain, thereby detecting information on magnitude and a frequency of a signal corresponding to a pointer in the AFE output signal A_OUT.

In operation S220, a frequency of a local oscillator may be set to a second frequency. For example, the controller 300a may determine a second frequency based on the frequency of the AFE output signal A_OUT detected in operation S140 and set the frequency of the local oscillator to the second frequency. That is, the controller 300a may determine the second frequency so that a frequency band (e.g., a frequency band due to noise) excluding a frequency band corresponding to a pointer is attenuated by the filter 204 based on a frequency band corresponding to the pointer coarsely detected in operation S140 and may set the frequency of the local oscillator to the second frequency. For example, as described later with reference to FIGS. 6A to 6C, the controller 300a may calculate the second frequency by adding or subtracting the frequency offset Δ to or from a center frequency of a frequency band corresponding to a pointer.

In operation S240, a pointer may be detected based on the AFE output signal A_OUT. Due to the frequency of the local oscillator set to the second frequency in operation S220, noise included in the AFE output signal A_OUT received in operation S240 may be more attenuated than noise in the AFE output signal A_OUT received in operation S140. Accordingly, the controller 300a may accurately detect a pointer based on the AFE output signal A_OUT. Operation S240 will be described later below in detail with reference to FIG. 7.

In an example embodiment, the first and second modes S100 and S200 may be repeated. That is, a pointer may be detected based on results of detecting the AFE output signal A_OUT by repeating the first and second modes S100 and S200. Further, it is possible to detect a writing pressure corresponding to the second frequency value by using the second frequency value.

Figure 6A:
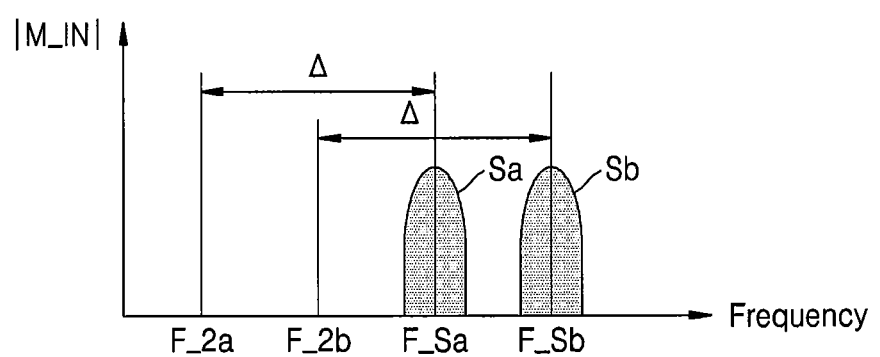
FIGS. 6A to 6C are graphs illustrating internal signals of an AFE of FIG. 3 in a frequency domain, according to an example embodiment of the inventive concept.
Figure 6B:
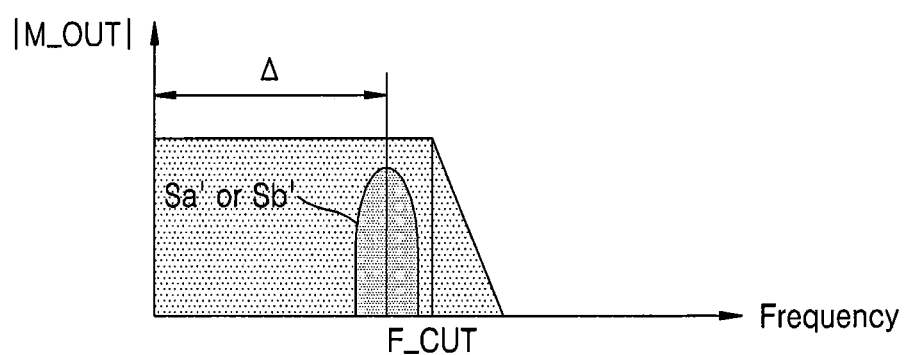
Figure 6C:
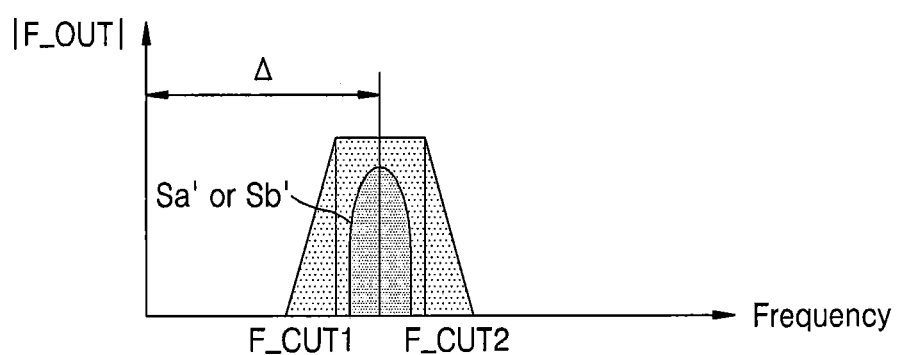

FIGS. 6A to 6C are graphs illustrating internal signals of the AFE 200a of FIG. 3 in a frequency domain, according to an example embodiment of the inventive concept. As described above with reference to FIG. 5, the controller 300a of FIG. 3 may set the frequency of the local oscillator signal LO (or the frequency of the local oscillator) to the second frequency in the second mode S200, based on the frequency of the AFE output signal A_OUT detected in the first mode S100. In more detail, FIG. 6A shows the mixer input signal M_IN corresponding to two touches of a pointer, and FIGS. 6B and 6C show the mixer output signal M_OUT generated by passing the mixer input signal M_IN of FIG. 6A through each of different filters. Hereinafter, FIGS. 6A to 6C will be described with reference to FIGS. 3 and 5.

Referring to FIG. 6A, a frequency band corresponding to a pointer may be different depending on a touch of the pointer. For example, as illustrated in FIG. 6A, the mixer input signal M_IN generated from the received signal RX may include a frequency band Sa of which a center frequency is 'F_Sa' or a frequency band Sb of which a center frequency is 'F_Sb', according to a touch of a pointer. The controller 300a may detect a location of a frequency band corresponding to a pointer, for example, a center frequency in the first mode S100 of FIG. 5.

The controller 300a may determine a frequency spaced a certain distance from the frequency band Sa as a second frequency of the second mode S200. For example, as illustrated in FIG. 6A, the controller 300a may calculate a frequency 'F_2a' obtained by subtracting the frequency offset Δ from the center frequency 'F_Sa' as a second frequency with respect to the frequency band Sa. Furthermore, the controller 300a may calculate a frequency 'F_2b' obtained by subtracting the frequency offset Δ from the center frequency 'F_Sb' as a second frequency with respect to the frequency band Sb. As described above with reference to FIGS. 4A and 4B, the frequency offset Δ used by the controller 300a to calculate a second frequency may be determined based on the cutoff frequency F_CUT of the filter 204a, and may have a fixed value due to the fixed cutoff frequency F_CUT. Thus, as will be described below with reference to FIGS. 6B and 6C, each of the frequency bands Sa and Sb corresponding to different touches of a pointer may be shifted to a substantially identical or similar location in the mixer output signal M_OUT.

Referring to FIG. 6B, in an example embodiment, the mixer output signal M_OUT may pass through a low-pass filter. For example, as illustrated in FIG. 6B, the filter 204a may include a low-pass filter having the cutoff frequency F_CUT and may output the filter output signal F_OUT by low-pass filtering the mixer output signal M_OUT. Shifted frequency bands Sa' and Sb' may be included in a pass band of the low-pass filter due to the frequency offset Δ which is less than the cutoff frequency F_CUT of the low-pass filter.

Referring to FIG. 6C, in an example embodiment, the mixer output signal M_OUT may pass through a band-pass filter. For example, as illustrated in FIG. 6C, the filter 204a may include a band-pass filter having cutoff frequencies F_CUT1 and F_CUT2 and may output the filter output signal F_OUT by band-pass filtering the mixer output signal M_OUT. The shifted frequency bands Sa' and Sb' may be included, between the cutoff frequencies F_CUT1 and F_CUT2, in a pass band of the band-pass filter due to the frequency offset Δ.

Figure 7:
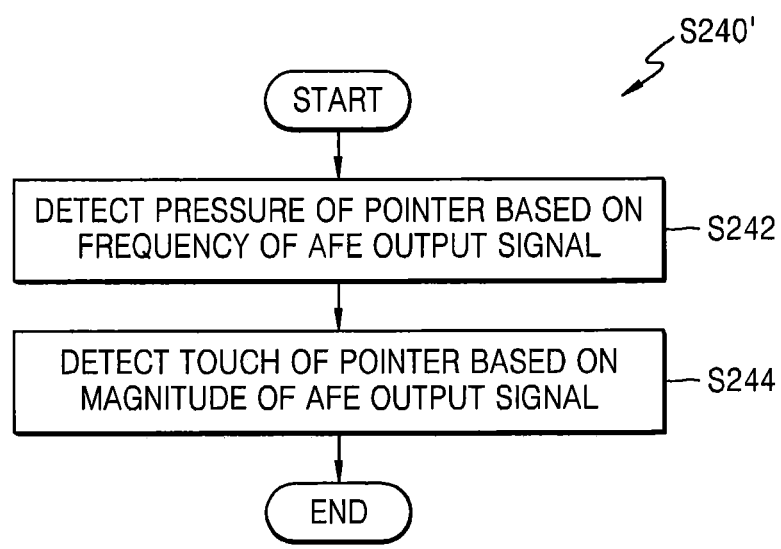
FIG. 7 is a flowchart of an embodiment of operation S240 in FIG. 5, according to an example embodiment of the inventive concept.

FIG. 7 is a flowchart of an example of operation S240 in FIG. 5, according to an example embodiment of the inventive concept. As described above with reference to FIG. 5, the controller 300a of FIG. 3 may detect a pointer based on the AFE output signal A_OUT in operation S240' of FIG. 7. Hereinafter, FIG. 7 will be described with reference to FIGS. 3 and 5.

In operation S242, pressure applied by the pointer may be detected based on the frequency of the AFE output signal A_OUT. For example, pressure applied by the pointer may be determined according to a detected frequency of the AFE output signal A_OUT and the second frequency may be determined by adding or subtracting the frequency offset Δ to or from the detected frequency of the AFE output signal A_OUT. That is, as described above with reference to FIG. 6A, the second frequency is the frequency of the local oscillator signal LO set in the second mode S200, and the controller 300a may set the frequency band of the local oscillator signal LO to the second frequency based on a frequency band corresponding to a pointer detected in the first mode S100. In an example embodiment, the first and second modes S100 and S200 of FIG. 5 may be repeated and the pressure applied by the pointer may be detected based on a plurality of second frequencies set in each of the operations in the second mode S200.

In operation S244, a touch of the pointer may be detected based on magnitude of the AFE output signal A_OUT. For example, among a plurality of electrodes included in the touch panel 100a, an electrode which is in contact with or close to the pointer may output a signal different from signals of the other electrodes as the received signal RX. Accordingly, the controller 300a may detect a touch of the pointer based on magnitude of the AFE output signal A_OUT generated from the received signal RX by the AFE 200a (or the receiver 230a) and may estimate coordinates of the location on the touch panel 100a touched by the pointer from a location of the electrode at which the touch of the pointer is detected. In addition, since a frequency band corresponding to the pointer is shifted to be included in the pass band of the filter 204a by the second frequency, the controller 300a may detect the touch of the pointer based on the AFE output signal A_OUT from which noise has been canceled so that the touch of the pointer may be accurately detected.

Figure 8A:
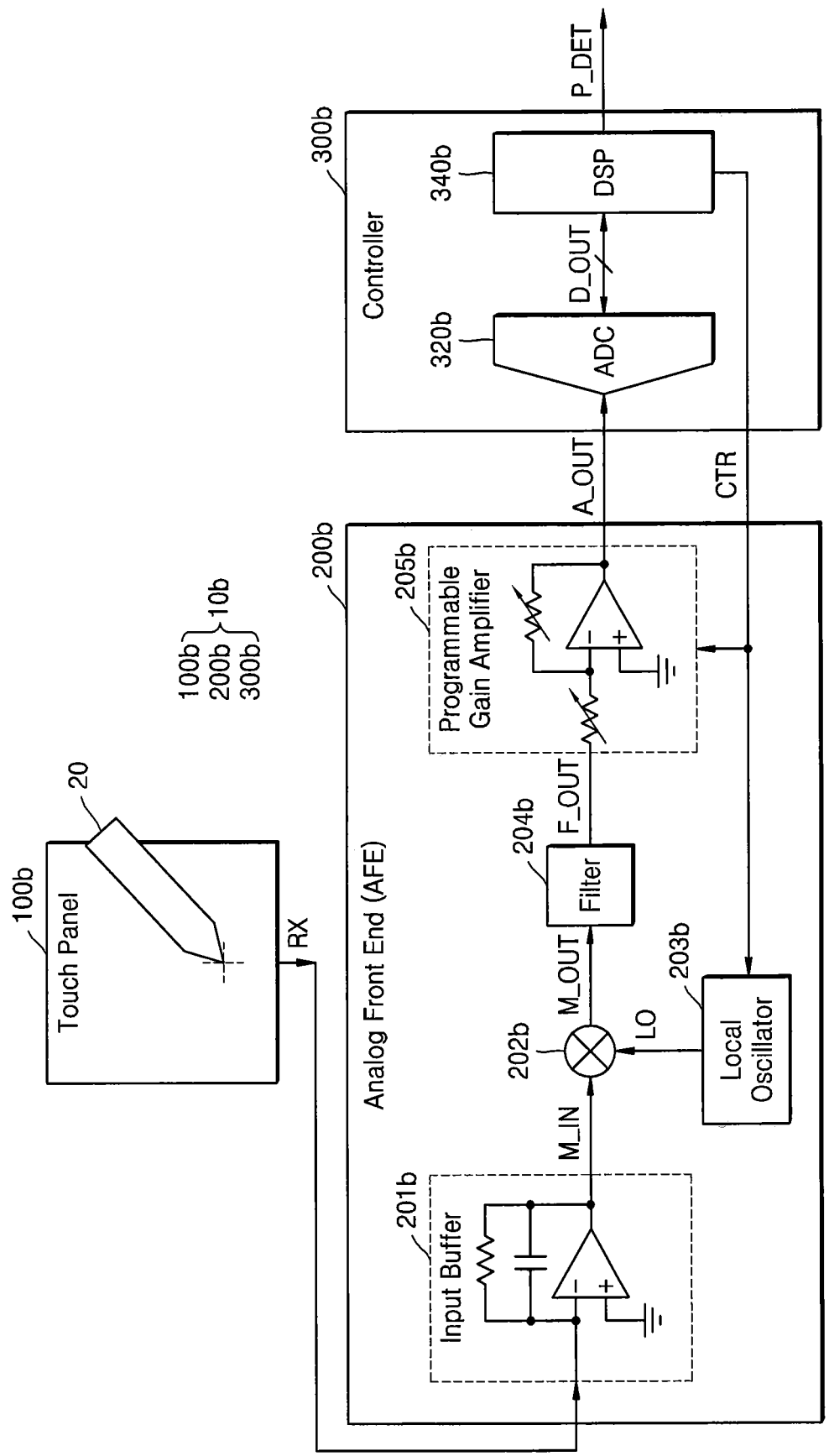
FIGS. 8A and 8B are block diagrams of pointer detection devices according to example embodiments of the inventive concept.
Figure 8B:
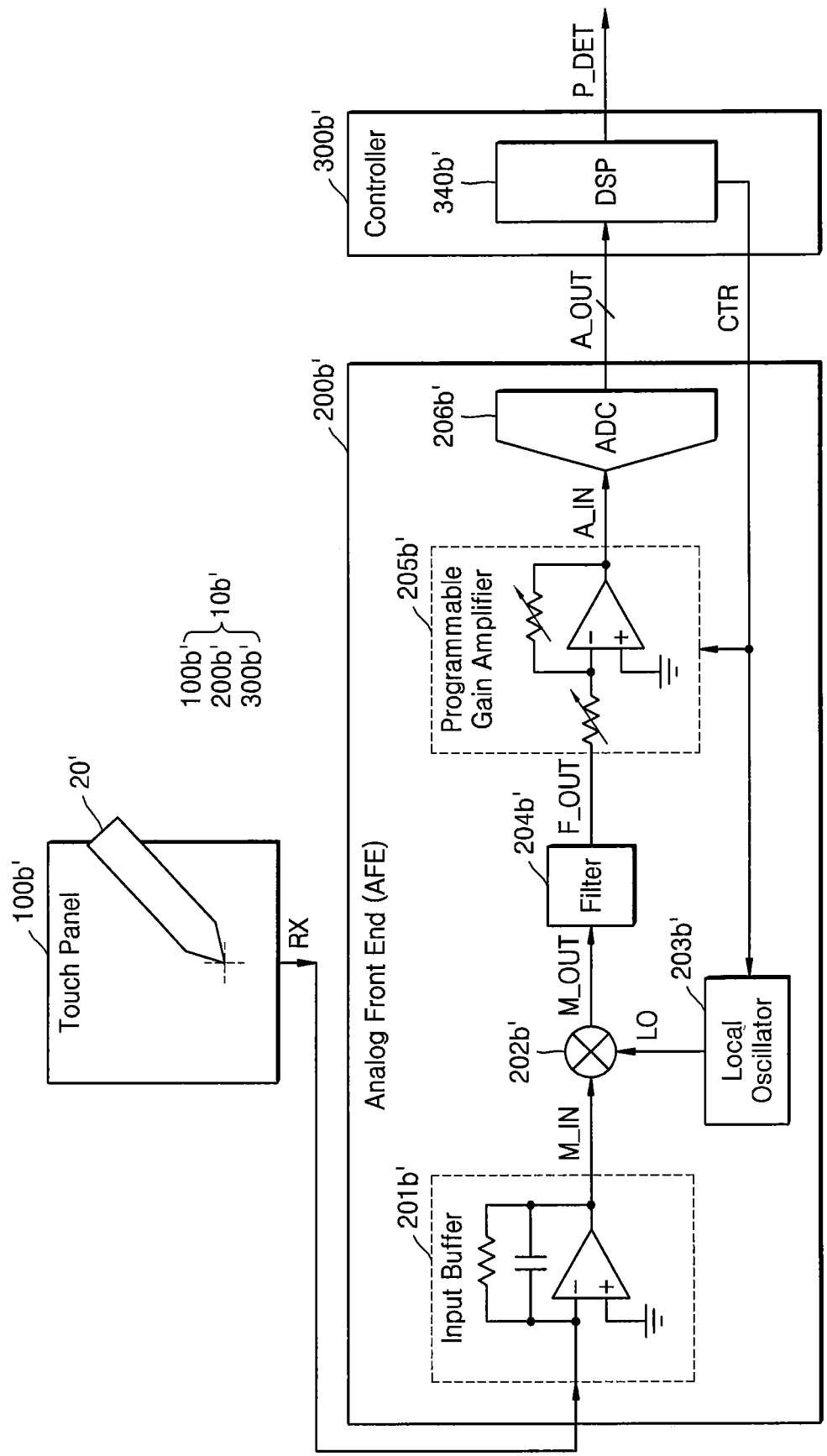

FIGS. 8A and 8B are block diagrams of pointer detection devices 10b and 10b' according to example embodiments of the inventive concept. Similar to the pointer detection device 10 of FIG. 1, a pointer detection device 10b of FIG. 8A may include a touch panel 100b, an AFE 200b, and a controller 300b, and a device 10b' of FIG. 8B may also include a touch panel 100b', an AFE 200b', and a controller 300b'. As illustrated in FIG. 8A, the touch panel 100b may be touched by a pen (or a stylus pen) as an example of a pointer 20. Hereinafter, in FIGS. 8A and 8B, the same reference numerals like in FIG. 1 denote the same elements, and therefore, further detailed descriptions thereof will be omitted. Only parts of the pointer detection device 10b' of FIG. 8B which are different from the pointer detection device 10b of FIG. 8A will be described.

The touch panel 100b may provide the AFE 200b with the received signal RX which varies according to a touch of the pointer 20. For example, when the pointer 20 is a passive stylus pen, the pointer 20 may change the received signal RX in response to energy supplied from the touch panel 100b (due to the transmission signal TX of FIG. 3). In addition, when the pointer 20 is an active stylus pen, the received signal RX may be changed according to a signal output from the pointer 20. The AFE 200b may generate the AFE output signal A_OUT from the received signal RX. As illustrated in 8A, the AFE 200b may include an input buffer 201b, a mixer 202b, a local oscillator 203b, a filter 204b, and a programmable gain amplifier 205b (or a variable gain amplifier). In FIG. 8A, a circuit included in the input buffer 201b and the programmable gain amplifier 205b is only provided as an example for convenience of illustration, and the input buffer 201b and the programmable gain amplifier 205b may include a circuit different from that of FIG. 8A.

The input buffer 201b (or a buffer circuit) may generate the mixer input signal M_IN from the received signal RX. For example, the received signal RX received from the touch panel 100b may have a varying current, and the input buffer 201b may function as a charge amplifier or a current-to-voltage converter so as to generate, from the received signal RX, the mixer input signal M_IN having a varying voltage.

The mixer 202b and the filter 204b may operate similarly to the mixer 202a and the filter 204a of FIG. 3. The local oscillator 203b may provide the local oscillator signal LO to the mixer 202b and may change the frequency of the local oscillator signal LO in response to the control signal CTR provided from the controller 300b. For example, the local oscillator 203b may include a phase locked loop (PLL) or a delay locked loop (DLL).

The programmable gain amplifier 205b may generate the AFE output signal A_OUT by amplifying the filter output signal F_OUT with a gain set according to the control signal CTR provided from the controller 300b. The filter output signal F_OUT may have a high signal-to-noise ratio (SNR) due to noise cancellation by the mixer 202b and the filter 204b, and the AFE output signal A_OUT output by the programmable gain amplifier 205b may also have a high SNR.

The controller 300b may receive the AFE output signal A_OUT and output the pointer detection signal P_DET by detecting a pointer based on the AFE output signal A_OUT. Furthermore, the controller 300b may output the control signal CTR for controlling the AFE 200b. As illustrated in FIG. 8A, the controller 300b may include an analog-to-digital converter (ADC) 320b and a digital signal processor (DSP) 340b.

The ADC 320b may generate a digital output signal D_OUT by converting the AFE output signal A_OUT. For example, a sampling frequency of the ADC 320b may be higher than a frequency of the transmission signal TX and may be high enough to detect frequency variation of the received signal RX.

A digital signal processor 340b may receive the digital output signal D_OUT from the ADC 320b and generate the pointer detection signal P_DET by detecting a pointer based on the digital output signal D_OUT. For example, the digital signal processor 340b may analyze a frequency spectrum of the AFE output signal A_OUT based on the digital output signal D_OUT and may detect coordinates and pressure of the pointer based on magnitude and frequency components of the AFE output signal A_OUT. Furthermore, the digital signal processor 340b may generate the control signal CTR for controlling the AFE 200b. For example, the digital signal processor 340b may adjust, through the control signal CTR, the local oscillator signal LO that changes a frequency of the received signal RX, based on frequency components of the AFE output signal A_OUT analyzed based on the digital output signal D_OUT. The digital signal processor 340b may include a core that executes a series of instructions and may include a logic block that is designed through logic synthesis or the like.

Referring to FIG. 8B, the AFE 200b' may include an ADC 206b' and may provide the AFE output signal A_OUT to the controller 300b' as a digital signal. For example, as illustrated in FIG. 8B, the ADC 206b' may receive an ADC input signal A_IN provided by the programmable gain amplifier 205b as an analog signal, and may output the AFE output signal A_OUT by converting the ADC input signal A_IN. Hereinafter, although example embodiments of the inventive concept describe that the ADC 320b is included in the controller 300b, it will be understood that the AFE 200b' may include the ADC 206b' as illustrated in FIG. 8B.

Figure 9A:
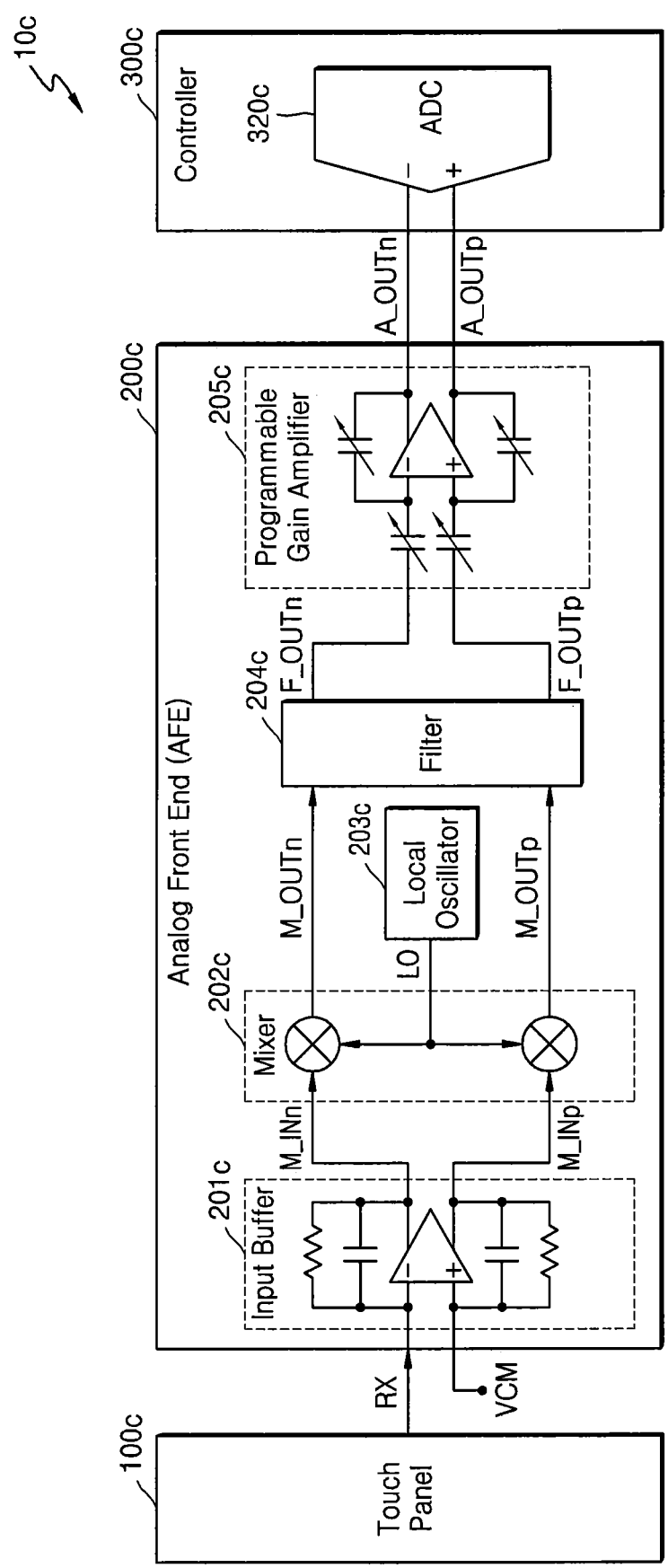
FIGS. 9A and 9B are block diagrams of pointer detection devices according to example embodiments of the inventive concept.
Figure 9B:
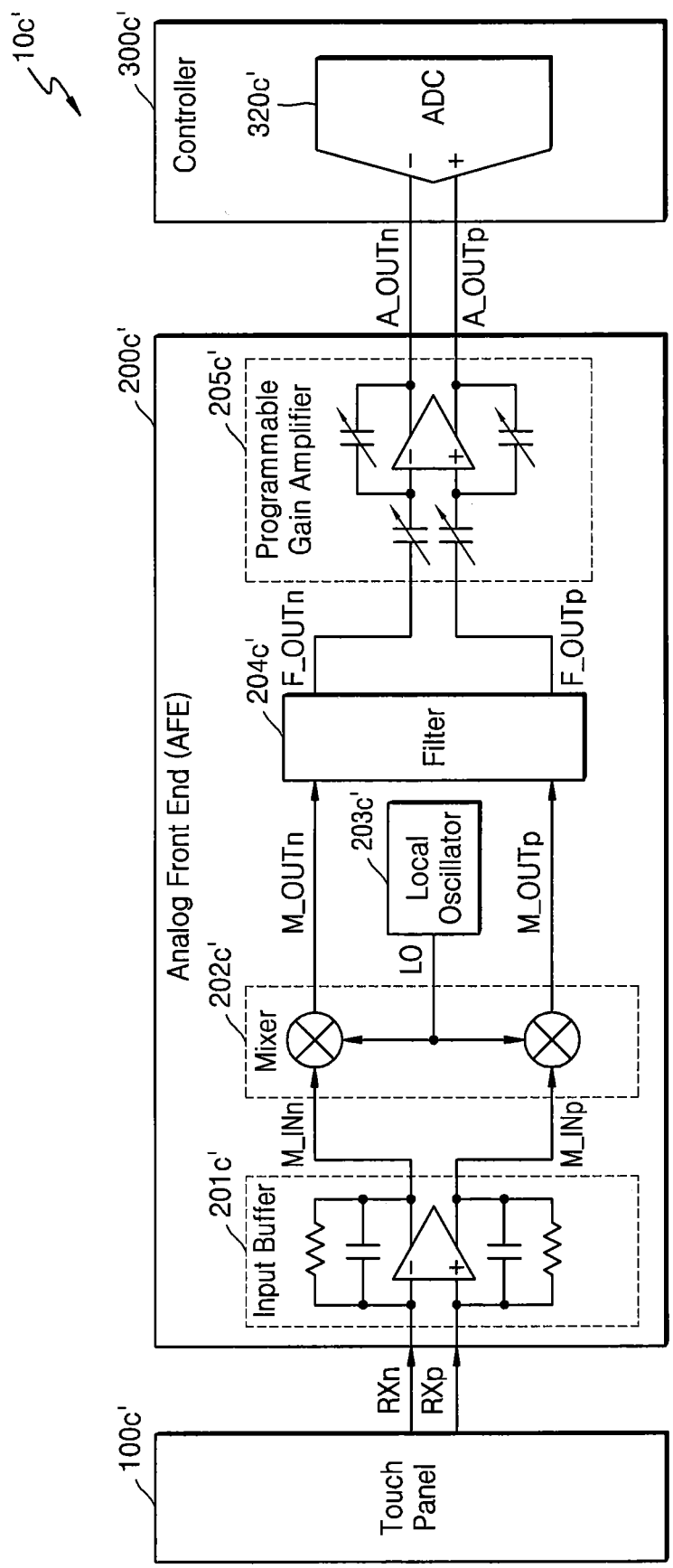

FIGS. 9A and 9B are block diagrams of pointer detection devices 10b and 10' according to example embodiments of the inventive concept. Similar to the pointer detection device 10b of FIG. 8A, a pointer detection device 10c of FIG. 9A includes a touch panel 100c, an AFE 200c, and a controller 300c, and a pointer detection device 10c' of FIG. 9B may also include a touch panel 100c', an AFE 200c', and a controller 300c'. Hereinafter, in FIG. 9A, the same reference numerals like in FIG. 8A denote the same elements, and therefore, further detailed descriptions thereof will be omitted. Only parts of the pointer detection device 10c' of FIG. 9B that are different from the pointer detection device 10c of FIG. 9A will be described.

Referring to FIG. 9A, the AFE 200c may include an input buffer 201c, a mixer 202c, a local oscillator 203c, a filter 204c, and a programmable gain amplifier 205c, and may process the received signal RX provided from the touch panel 100c in a differential mode. For example, as illustrated in FIG. 9A, the input buffer 201c may receive the received signal RX and the common mode voltage VCM, and may output the mixer input signals M_INn and M_INp which are differential signals. The mixer 202c may output the mixer output signals M_OUTn and M_OUTp, which are differential signals, by heterodyning each of the mixer input signals M_INn and M_INp based on the local oscillator signal LO provided from the local oscillator 203c. The filter 204c may output filter output signals F_OUTn and F_OUTp, which are differential signals, by filtering each of the mixer output signals M_OUTn and M_OUTp with an identical cutoff frequency. The programmable gain amplifier 205c may include a differential amplifier and may output AFE output signals A_OUTn and A_OUTp, which are differential signals, by amplifying the filter output signals F_OUTn and F_OUTp. The controller 300c may include an ADC 320c for receiving the AFE output signals A_OUTn and A_OUTp, which are differential signals, as illustrated in FIG. 9A. As described above with reference to FIG. 8B, in an example embodiment, an AFE may include an ADC and the AFE may provide a controller with a digital signal converted from a differential signal.

Although not shown in FIG. 9A, the local oscillator 204c may adjust the frequency of the local oscillator signal LO in response to a control signal received from the controller 300c. In FIG. 9A, a circuit included in the input buffer 201c and the programmable gain amplifier 205c is only provided as an example for convenience of illustration, and the input buffer 201c and the programmable gain amplifier 205c may include a circuit different from that of FIG. 9A.

Referring to FIG. 9B, the touch panel 100c' may differentially provide the received signals RXn and RXp, which are signals of two adjacent panels, to the AFE 200c'. For example, as illustrated in FIG. 9B, the touch panel 100c' may differentially provide the received signals RXn and RXp, which vary according to a touch of a pointer, of two adjacent panels to the AFE 200c'. An input buffer 201c' of the AFE 200c' may output the mixer input signals M_INn and M_INp, which are differential signals, by buffering the received signals RXn and RXp.

Figure 10A:
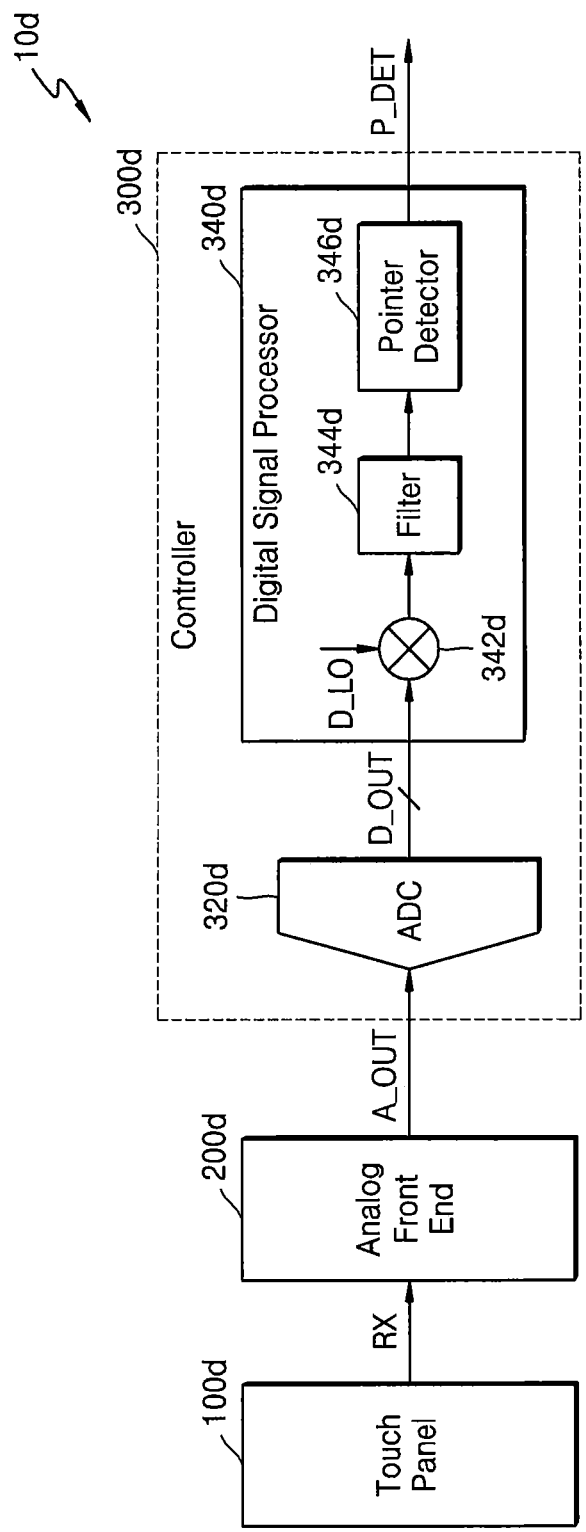
FIGS. 10A to 10C are block diagrams of pointer detection devices according to example embodiments of the inventive concept.
Figure 10B:
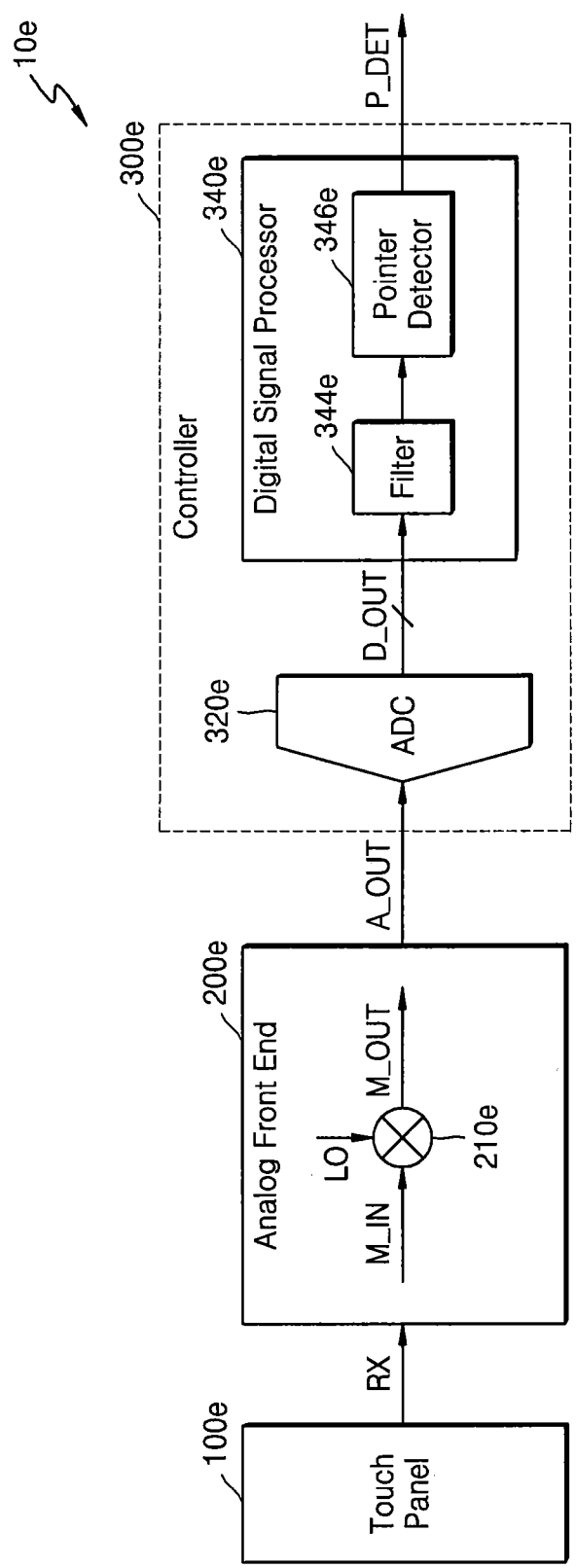
Figure 10C:
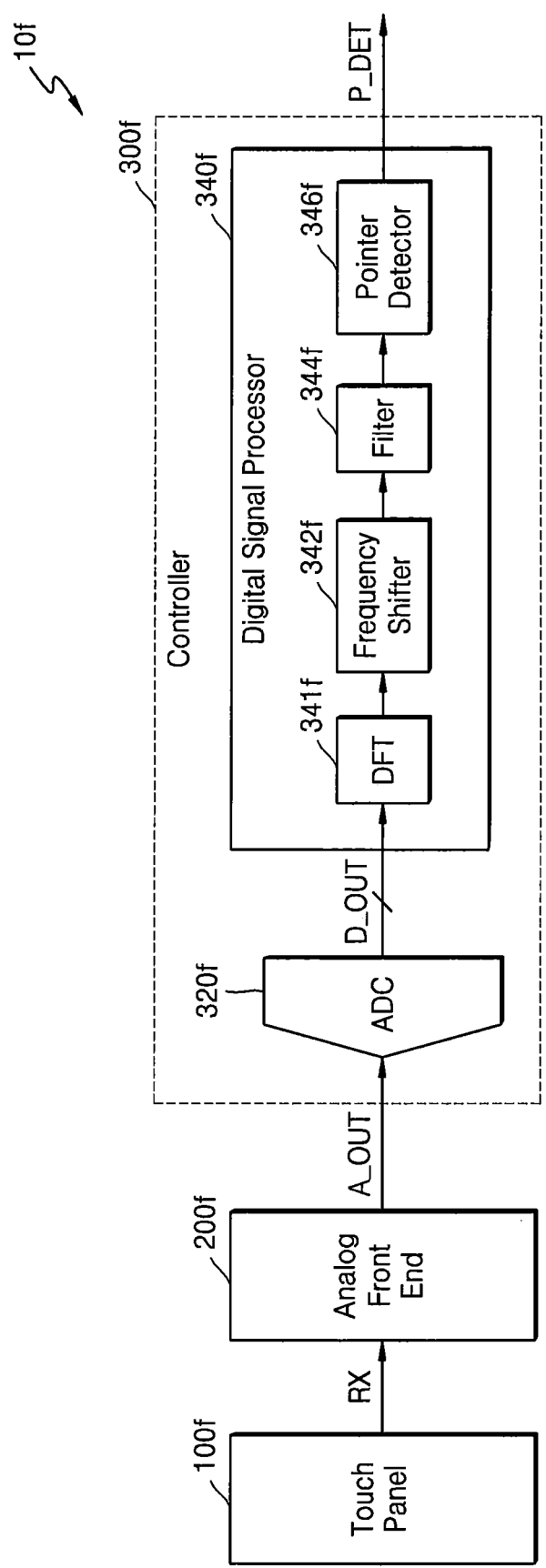

FIGS. 10A to 10C are block diagrams of pointer detection devices 10d, 10e, and 10f according to example embodiments of the inventive concept. In the pointer detection devices 10d, 10e, and 10f of FIGS. 10A to 10C, a frequency band corresponding to a pointer included in the received signal RX may be shifted and/or filtered by digital signal processing.

Referring to FIG. 10A, the pointer detection device 10d may include a touch panel 100d, an AFE 200d, and a controller 300d. The AFE 200d may generate the AFE output signal A_OUT by processing the received signal RX provided from the touch panel 100d. For example, the AFE 200d may provide the AFE output signal A_OUT having a varying voltage by amplifying (or converting) the received signal RX having a varying current.

The controller 300d may include an ADC 320d and a digital signal processor 340d. The ADC 320d may output the digital output signal D_OUT by converting the AFE output signal A_OUT. The digital signal processor 340d may include a mixer 342d, a filter 344d, and a pointer detector 346d and each of the mixer 342d, the filter 344d, and the pointer detector 346d may be operated through logic operations or the like. For example, the local oscillator signal D_LO provided to the mixer 342d may include a series of digital samples indicating a constant frequency and the mixer 342d may multiply the digital output signal D_OUT and a local oscillator signal D_LO. The filter 344d may filter a digital signal output by the mixer 342d and may include, for example, a finite impulse response (FIR) filter or an infinite impulse response (IIR) filter. Similar to that described above with reference to FIG. 1 and the like, a frequency of the local oscillator signal D_LO may be determined based on a cutoff frequency of the filter 344d.

The pointer detector 346d may generate the pointer detection signal P_DET by detecting a pointer based on a digital signal output by the filter 344d. For example, similar to that described above with reference to FIG. 7, the pointer detector 346d may detect pressure applied by the pointer by detecting a frequency of the digital signal output by the filter 344d, and may detect coordinates or a location of the pointer based on magnitude of the digital signal output by the filter 344d. The pointer detection signal P_DET may include information on the pressure applied by the pointer and/or the coordinates of the location touched by the pointer. Each of the mixer 342d, the filter 344d, and the pointer detector 346d included in the digital signal processor 340d may be a hardware module designed through logic synthesis or the like or may be a software module including a series of instructions to be performed by a core included in the digital signal processor 340d.

Referring to FIG. 10B, the pointer detection device 10e may include a touch panel 100e, an AFE 200e, and a controller 300e. In the pointer detection device 10e of FIG. 10B, shifting of the frequency band corresponding to the pointer may be performed in the AFE200e, while filtering may be performed in the controller 300e through digital signal processing. For example, as illustrated in FIG. 10B, the AFE 200e may include a mixer 210e, and the mixer 210e may output the mixer output signal M_OUT by heterodyning the mixer input signal M_IN based on the frequency of the local oscillator signal LO. Although not shown, the AFE 200e may include an input buffer for generating the mixer input signal M_IN from the received signal RX or an amplifier for amplifying the mixer output signal M_OUT.

The controller 300e may include an ADC 320e that converts the AFE output signal A_OUT to the digital output signal D_OUT and may further include a digital signal processor 340e that generates the pointer detection signal P_DET by processing the digital output signal D_OUT. As illustrated in FIG. 10B, the digital signal processor 340e may include a filter 344e and a pointer detector 346e and the filter 344e and the pointer detector 346e may respectively perform the same or similar operations as the filter 344d and the pointer detector 346e of FIG. 10A.

Referring to FIG. 10C, the pointer detection device 10f may include a touch panel 100f, an AFE 200f, and a controller 300f. In the pointer detection device 10f of FIG. 10C, the controller 300f performs digital signal processing in a frequency domain, thereby performing shifting and filtering of the frequency band corresponding to the pointer. Similar to the AFE 200d of FIG. 10A, the AFE 200f may generate the AFE output signal A_OUT from the received signal RX provided from the touch panel 100f.

The controller 300f may include an ADC 320F that converts the AFE output signal A_OUT to the digital output signal D_OUT and may further include a digital signal processor 340f that generates the pointer detection signal P_DET by processing the digital output signal D_OUT. As illustrated in FIG. 10C, the digital signal processor 340f may include a OFT module 341f, a frequency shifter 342f, a filter 344f, and a pointer detector 34a and each of the DFT module 341f, the frequency shifter 342f, the filter 344f, and the pointer detector 346f may be operated through logic operations or the like. For example, the DFT module 341f may perform discrete Fourier transform (DFT) on the digital output signal D_OUT, and thus a signal output from the DFT module 341f may be a digital signal indicating a frequency spectrum of the AFE output signal A_OUT. The frequency shifter 342f may shift frequency components within a certain range in the signal output from the DFT module 341f and, among the shifted frequency components, frequency components corresponding to the frequency band corresponding to the pointer may be located in a pass band of the filter 344f. The filter 344f may attenuate frequency components other than those included in the pass band and the pointer detector 346f may detect a pointer based on frequency components that remain in a signal output from the filter 344f. In an example embodiment, the frequency shifter 342f of FIG. 10C may be omitted and the filter 344f may extract only frequency components that are within a certain range in the signal output from the DFT module 341f.

Unlike FIGS. 10A to 10C, in an example embodiment, an ADC may be included in an AFE. That is, similar to that described above with reference to FIG. 8B, when an AFE includes an ADC, the AFE may provide a digital signal (e.g., D_OUT in FIGS. 10A to 10C), and a digital signal processor included in a controller may process a digital signal provided from the AFE.

Figure 11:
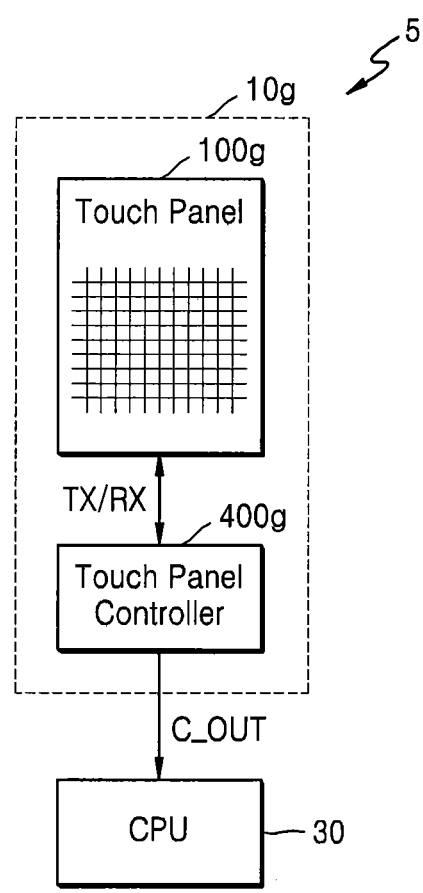
FIG. 11 is a block diagram of a system including a frequency detection device, according to an example embodiment of the inventive concept.

FIG. 11 is a block diagram of a system 5 including a frequency detection device, according to an example embodiment of the inventive concept. The system 5 may be a computing system such as a PC, a network server, a tablet PC, an e-reader, a PDA, a PMP, a mobile phone, a smart phone, a wearable device, etc., or a control system for controlling a car, a mechanical device, a manufacturing facility, a door, or the like. As illustrated in FIG. 11, the system 5 may include a pointer detection device 10g and a central processing unit (CPU) 30.

The CPU 30 may control a general operation of the system 5. For example, the CPU 30 may control operations of the system 5 by executing a series of instructions stored in memory, and may recognize an external input based on a controller output signal C_OUT received from the pointer detection device 10g.

The pointer detection device 10g may include a touch panel 100g and a touch panel controller 400g. The touch panel controller 400g may provide the transmission signal TX to the touch panel 100g and may receive the received signal RX from the touch panel 100g. The touch panel controller 400g may include a mixer and a filter and shift the frequency band corresponding to the pointer included in the received signal RX as described above with reference to FIG. 1, and may output the controller output signal C_OUT by filtering a signal including the shifted frequency band by passing the shifted frequency band.

In an example embodiment, the controller output signal C_OUT output by the touch panel controller 400g may be an analog signal. For example, like the AFE output signal A_OUT in FIG. 8A, the touch panel controller 400g may output the controller output signal C_OUT which is an analog signal by buffering, heterodyning, filtering and/or amplifying the received signal RX. The CPU 3Q may include an ADC for converting the controller output signal C_OUT to a digital signal, and may detect a pointer by processing the digital signal.

In an example embodiment, the controller output signal C_OUT output by the touch panel controller 400g may be a digital signal. For example, like the digital output signal D_OUT in FIG. 8A, the touch panel controller 400g may include an ADC for converting a signal output from an AFE processing the received signal RX into a digital signal, and may output a signal output from the ADC as the controller output signal C_OUT. The CPU 30 may detect a pointer by processing the controller output signal C_OUT, which is a digital signal.

In an example embodiment, the touch panel controller 400g may output the controller output signal C_OUT that includes information about a touch of a pointer. For example, like the pointer detection signal P_DET of FIG. 8A, the touch panel controller 400g may include an ADC and a digital signal processor, and may output the controller output signal C_OUT including information about a touch of a pointer detected by the digital signal processor, for example, information about pressure and/or coordinates of the pointer. The CPU 30 may perform a function corresponding to the information about the touch of the pointer included in the controller output signal C_OUT.

Figure 12:
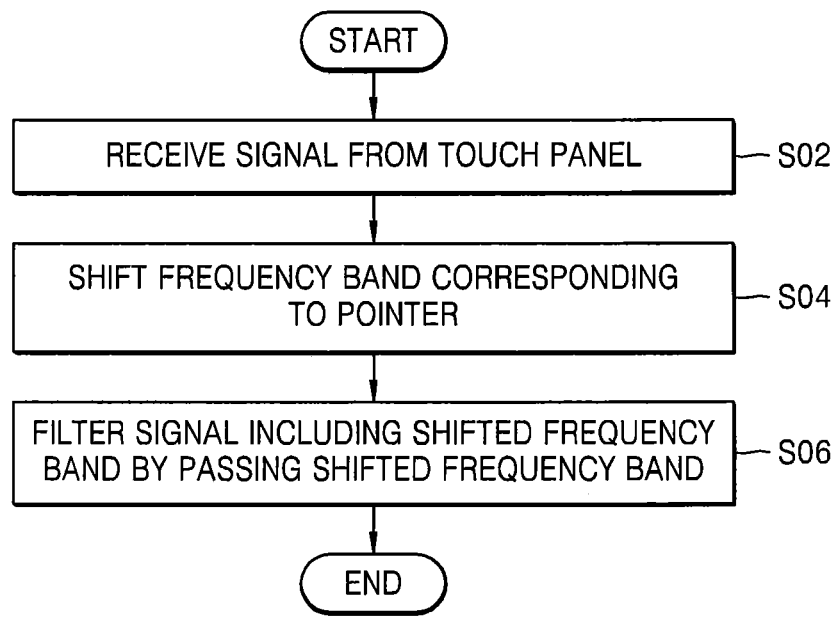
FIG. 12 is a flowchart of methods of detecting a pointer according to example embodiments of the inventive concept.

FIG. 12 is a flowchart of a method of detecting a pointer according to an example embodiment of the inventive concept. For example, the method of detecting the pointer of FIG. 12 may be performed by the AFE 200 of FIG. 1 and may also be referred to as a method of operating the AFE 200 or a method of canceling noise for pointer detection. Hereinafter, FIG. 12 will be described with reference to FIG. 1.

In operation S02, an operation of receiving a signal from a touch panel may be performed. For example, the AFE 200 of FIG. 1 may receive the received signal RX provided to the touch panel 100, and a frequency and magnitude of the received signal RX may vary according to a touch of a pointer on the touch panel 100.

In operation S04, an operation of shifting a frequency band corresponding to the pointer may be performed. For example, the mixer 202 included in the AFE 200 of FIG. 1 may heterodyne the mixer input signal M_IN according to the frequency of the local oscillator signal LO. Accordingly, the frequency band corresponding to the pointer may be shifted, and the shifted frequency band may be included in a pass band of the filter 204.

In operation S06, an operation of filtering noise may be performed by passing the shifted frequency band through the filter 204. For example, the filter 204 included in the AFE 200 of FIG. 1 may have the pass band including the frequency band corresponding to the pointer, and may remove a frequency band due to noise in a stop band.

Figure 13:
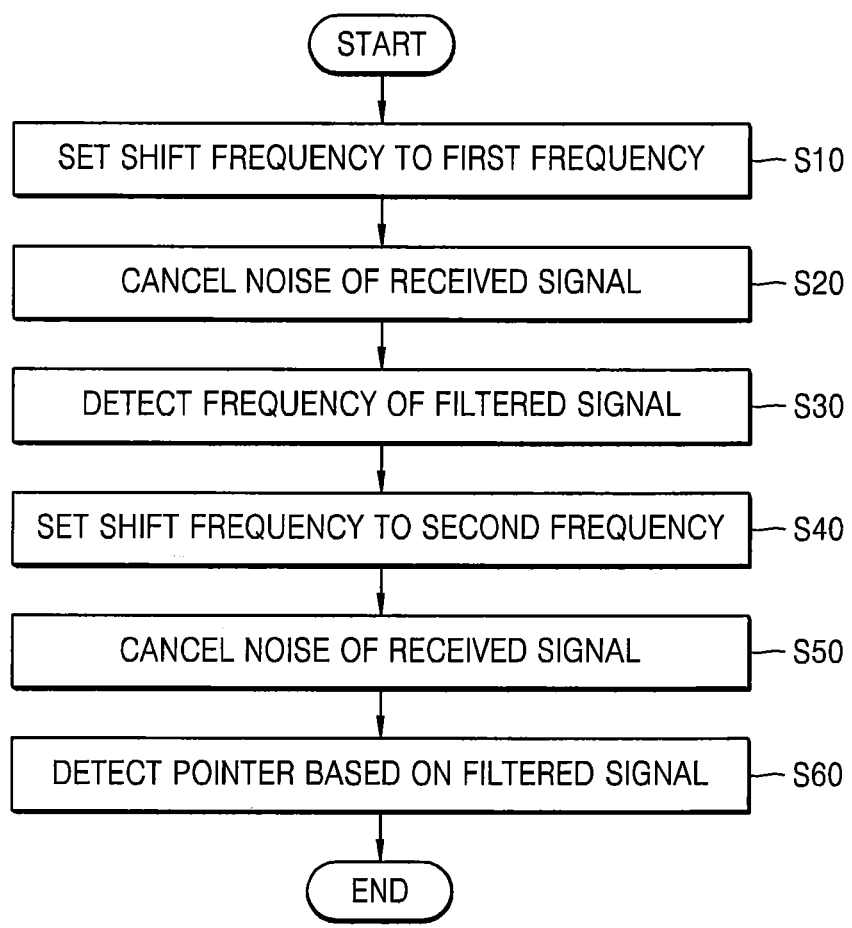
FIG. 13 is a flowchart of methods of detecting a pointer according to example embodiments of the inventive concept.

FIG. 13 is a flowchart of a method of detecting a pointer according to an example embodiment of the inventive concept. For example, the method of detecting the pointer of FIG. 13 may be performed by the pointer detection device 10a of FIG. 3. As described above with reference to FIG. 7, operations S10 to S60 of FIG. 13 may be repeated and a pointer may be detected based on results of currently performed operations S10 through S60 as well as results of previously performed operations S10 through S60. Hereinafter, FIG. 13 will be described with reference to FIG. 3.

In operation S10, an operation of setting a shift frequency to a first frequency may be performed. For example, the shift frequency may be the frequency of the local oscillator signal LO input to the mixer 202a, and the controller 300a may set the frequency of the local oscillator signal LO to the first frequency through the control signal CTR.

In operation S20, an operation of canceling noise of the received signal RX may be performed. For example, similar to the description provided above with reference to FIG. 12, a frequency band of the received signal RX may be shifted according to the first frequency to be included in a pass band of a filter, while a frequency band due to noise may be shifted according to the first frequency to be included in a stop band of the filter.

In operation S30, an operation of detecting a frequency of a filtered signal may be performed. For example, the controller 300a may perform an operation of detecting a frequency of the AFE output signal A_OUT that is equal to the filter output signal F_OUT or obtained by amplifying the filter output signal F_OUT. Since the noise has been canceled from the AFE output signal A_OUT, the controller 300a may easily detect a location of a frequency band corresponding to a pointer. In an example embodiment, operations S10, S20, and S30 may be performed in a first mode (or a coarse mode).

In operation S40, an operation of setting a shift frequency to a second frequency may be performed. For example, the controller 300a may determine a second frequency based on the frequency detected in operation S30 and set a shift frequency to the second frequency. In an example embodiment, as described above with reference to FIG. 6A, the second frequency may be calculated by adding or subtracting the frequency offset Δ to or from the detected frequency and the frequency offset Δ may be a value determined based on a cutoff frequency (or a pass band) of the filter 204a.

In operation S50, an operation of canceling noise of the received signal RX may be performed. For example, similar to the description provided above with reference to FIG. 12, a frequency band of the received signal RX may be shifted according to the second frequency to be included in a pass band of a filter, while a frequency band due to noise may be shifted according to the second frequency to be included in a stop band of the filter. Due to the second frequency determined based on the detected frequency, noise may be effectively canceled.

In operation S60, an operation of detecting a pointer may be performed based on the filtered signal. For example, the controller 300a may detect pressure and/or a touch of a pointer based on the AFE output signal A_OUT and may generate the pointer detection signal P_DET including information on the pressure and/or coordinates of the pointer. By canceling noise in the preceding operations, the controller 300a may easily and accurately detect a pointer from the AFE output signal A_OUT. In an example embodiment, operations S40, S50, and S60 may be performed in a second mode (or a fine mode).

Figure 14:
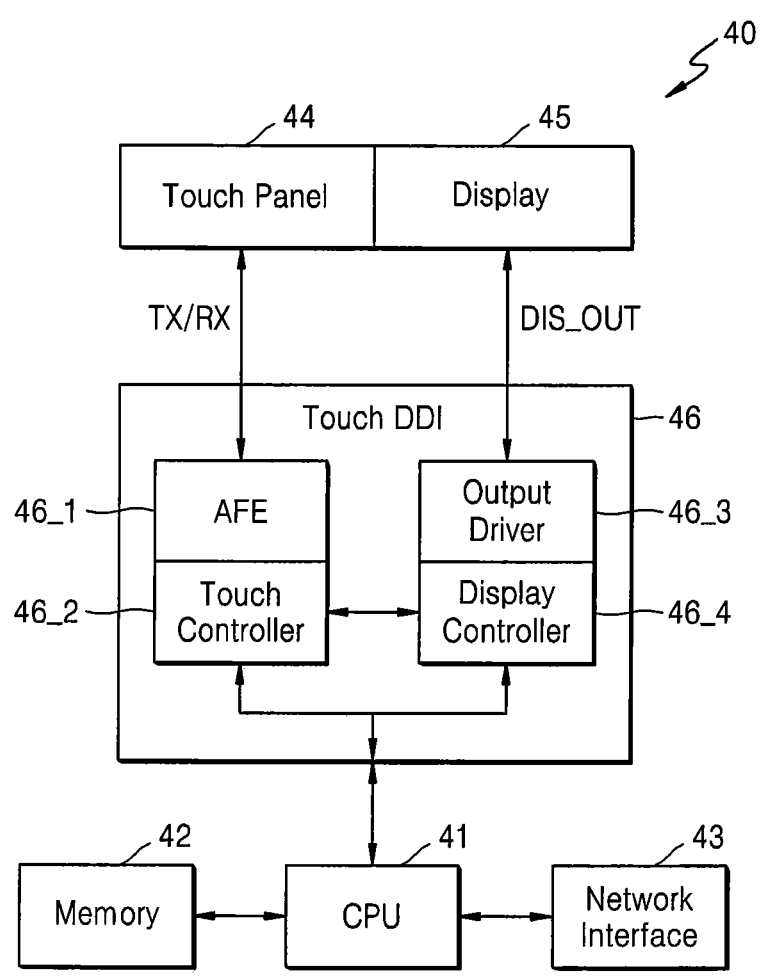
FIG. 14 is a block diagram of a system according to an example embodiment of the inventive concept.

FIG. 14 is a block diagram of a system 40 according to an example embodiment of the inventive concept. As illustrated in FIG. 14, the system 40 may include a CPU 41, a memory 42, a network interface 43, a touch panel 44, a display 45, and a touch display driver IC (DDI) 46. Unlike FIG. 14, the CPU 41 and other components of the system 40 may be communicatively connected to a bus.

The CPU 41 may control a general operation of the system 40 by executing instructions stored in the memory 42 or memory included in the CPU 41. For example, the CPU 41 may provide image data to the touch DDI 46 and recognize an external input by interpreting a touch of a pointer on an image output to the display 45, and may perform at least one function predetermined in response to the external input. In an example embodiment, the CPU 41 may be a system-on-chip (SoC) that includes a processor, a bus, and a functional block, or may be referred to as an application processor (AP).

The memory 42 may be accessed by the CPU 41 and may include, for example, as nonvolatile memory, electrically erasable programmable read-only memory (EEPROM), flash memory, phase change random-access memory (PRAM), resistive RAM (RRAM), nano-floating gate memory (NFGM), polymer RAM (PoRAM), magnetic RAM (MRAM), or ferroelectric RAM (FRAM), and may include, as volatile memory, dynamic RAM (DRAM), static RAM (SRAM), mobile DRAM, double data rate synchronous DRAM (DDR SDRAM), low power DDR (LPDDR), graphic DDR (GDDR) SDRAM, or rambus DRAM (RDRAM).

The network interface 43 may provide an interface to a network outside the system 40 to the CPU 41. For example, the network interface 43 may be connected to a wired or wireless network, may transmit signals received from the network to the CPU 41, or may transmit signals received from the CPU 41 to the network.

The touch DDI 46 may be implemented as a single chip and may include an AFE 46_1 and a touch controller 46_2 as components for controlling the touch panel 44, and may further include an output driver 46_3 and a display controller 46_4 as components for controlling the display 45. The touch panel 44 may be disposed on the display 45 and may transmit an output of the display 45 and the touch panel 44 and the display 45 may be collectively referred to as a touch screen.

The AFE 46_1 may provide the transmission signal TX to the touch panel 44 and receive the received signal RX from the touch panel 44. The AFE 46_1 may shift a frequency band corresponding to the pointer to be included in a pass band of a filter in the received signal RX and may cancel noise through filtering. The touch controller 46_2 may detect a pointer based on a signal from which noise has been canceled and may provide the CPU 41 with a signal including information on a touch of the pointer.

The display controller 46_4 may convert image data provided by the CPU 41 into a signal for displaying an image on the display 45 and the output driver 46_3 may output a display output signal DIS_OUT under control of the display controller 46_4. As illustrated in FIG. 14, the display controller 46_4 may communicate with the touch controller 46_2. For example, the display controller 46_4 may provide a signal including information on display timing to the touch controller 46_2, and the touch controller 46_2 may provide the display controller 46_4 with a signal including information on an operation mode, for example, information on whether the display 45 has entered a standby mode.

Although not shown in FIG. 14, the touch DDI 46 may include memory accessed by the touch controller 46_2 and/or the display controller 46_4, and may further include a power supply circuit providing the AFE 46_1 and the output driver 46_3 with power. Furthermore, unlike in FIG. 14, the touch controller 46_2 and the display controller 46_4 may communicate with the CPU 41 through separate interfaces (e.g., LoSSI, I2C, etc.).

While the inventive concept has been particularly shown and described with reference to example embodiments thereof, it will be understood that various changes in form and details may be made therein without departing from the spirit and scope of the following claims.

What is claimed is:

1. A pointer detection device, comprising:
a mixer configured to generate a first output signal by heterodyning a local oscillator signal having an adjustable frequency with an input signal having a characteristic that varies in response to a touch of a pointer, said input signal having relatively low frequency input noise and/or relatively high frequency input noise associated therewith, with the relatively low frequency input noise having frequencies below a frequency of the input signal and/or the relatively high frequency input noise having frequencies above the frequency of the input signal;
a filter configured to generate a second output signal in response to filtering the first output signal, to thereby attenuate output noise associated with the first output signal that is attributable to the relatively low and/or high frequency input noise; and
a controller configured to: (i) generate a touch detection signal in response to the second output signal, (ii) generate a feedback control signal that sets the adjustable frequency of the local oscillator signal, and (iii) adjust the value of the feedback control signal and the frequency of the local oscillator signal so that a frequency of the first output signal is set to a level outside a range of frequencies of the output noise.

2. The pointer detection device of claim 1, wherein the frequency of the first output signal is within a passband range of frequencies associated with said filter.

3. The pointer detection device of claim 1, wherein the touch detection signal has a characteristic that is a function of a degree of pressure applied by the pointer to a touch panel device, which is configured to generate the input signal.

4. The pointer detection device of claim 1, wherein said controller is configured to set the frequency of the local oscillator signal to thereby adjust a frequency of the second output signal by a frequency offset, which is associated with a cutoff frequency of said filter.

5. A pointer detection device, comprising:
a mixer configured to generate a first output signal by heterodyning a local oscillator signal with an input signal having a characteristic that varies in response to a touch of a pointer, said input signal having relatively low frequency input noise and/or relatively high frequency input noise associated therewith, with the relatively low frequency input noise having frequencies below a frequency of the input signal and/or the relatively high frequency input noise having frequencies above the frequency of the input signal;

a filter configured to generate a second output signal in response to filtering the first output signal, to thereby attenuate output noise associated with the first output signal that is attributable to the relatively low and/or high frequency input noise;

a variable gain amplifier configured to generate a third output signal in response to the second output signal; and a controller configured to generate a touch detection signal in response to the third output signal, said controller configured to generate a feedback control signal, which sets an adjustable gain of said variable gain amplifier and an adjustable frequency of the local oscillator signal so that a frequency of the first output signal is feedback-controlled to a level outside a range of frequencies of the output noise.

6. The pointer detection device of claim 5, wherein the touch detection signal has a characteristic that is a function of a degree of pressure applied by the pointer to a touch panel device, which is configured to generate the input signal.

7. The pointer detection device of claim 6, wherein said controller comprises an analog-to-digital converter (ADC) responsive to the third output signal and a digital signal processor (DSP) responsive to a digital signal generated at an output of the ADC; and wherein the feedback control signal is generated by the DSP.

8. A pointer detection device for processing an input signal varying according to a touch of a pointer, the pointer detection device comprising:

a mixer configured to generate a first output signal by heterodyning the input signal according to a frequency of a local oscillator, said input signal having relatively low frequency input noise and/or relatively high frequency input noise associated therewith, with the relatively low frequency input noise having frequencies below a frequency of the input signal and/or the relatively high frequency input noise having frequencies above the frequency of the input signal;

a filter configured to output a second output signal by filtering the first output signal to thereby attenuate output noise associated with the first output signal that is attributable to the relatively low and/or high frequency input noise, wherein the mixer is configured to shift a frequency band corresponding to the pointer to a pass band of the filter; and a controller configured to detect the touch and pressure applied by the pointer and further configured to set and adjust the frequency of the local oscillator so that a frequency of the first output signal is controlled to a level outside a range of frequencies of the output noise, detect a frequency of the second output signal corresponding to the frequency of the local oscillator set to a first frequency, calculate a second frequency based on the detected frequency of the second output signal and the pass band, and detect the touch of the pointer based on the second output signal corresponding to the frequency of the local oscillator set to the second frequency.

9. The pointer detection device of claim 8, wherein the controller is configured to sequentially repeat operations of setting the frequency of the local oscillator to the first frequency, calculating the second frequency, and setting the frequency of the local oscillator to the second frequency.

10. The pointer detection device of claim 9, wherein the controller is configured to use a second frequency value to detect a writing pressure corresponding to the second frequency value.

11. The pointer detection device of claim 8, wherein the controller is configured to calculate the second frequency by adding or subtracting a frequency offset to or from the frequency of the second output signal, wherein the frequency offset is determined based on a cutoff frequency of the filter.

12. The pointer detection device of claim 8, further comprising:

a variable gain amplifier configured to generate a third output signal by amplifying the second output signal with a gain set by the controller, wherein the controller includes an analog-to-digital converter (ADC) for outputting a digital output signal by converting the third output signal, and is configured to detect the touch and pressure applied by the pointer by processing the digital output signal.

13. The pointer detection device of claim 8, wherein the filter is a low-pass filter, and wherein the mixer is configured to generate the first output signal by down-converting the input signal.

14. The pointer detection device of claim 8, further comprising:

a buffer circuit configured to convert a signal having a varying current from a touch panel into the input signal having a varying voltage.

15. The pointer detection device of claim 8, wherein the filter includes a plurality of passive devices.

* * * * *